United States Patent [19]

Tautzenberger et al.

[11] Patent Number: 4,554,027

[45] Date of Patent: Nov. 19, 1985

[54] SHAPED PART MADE OF A COMPOSITE MATERIAL AND A PROCESS FOR ITS PRODUCTION

[75] Inventors: Peter Tautzenberger, Niefern-Öschelbronn; Friedrich Schneider, Pforzheim; Dieter Stoeckel, Birkenfeld, all of Fed. Rep. of Germany

[73] Assignee: G. Rau GmbH & Co., Pforzheim, Fed. Rep. of Germany

[21] Appl. No.: 611,164

[22] Filed: May 17, 1984

[30] Foreign Application Priority Data

May 28, 1983 [DE] Fed. Rep. of Germany ....... 3319395

[51] Int. Cl.⁴ .......................................... B21D 53/00
[52] U.S. Cl. ................................ 148/11.5 R; 148/402
[58] Field of Search ............ 428/960; 148/402, 11.5 R

[56] References Cited

U.S. PATENT DOCUMENTS 3,725,835 4/1973 Hopkins et al. ................. 337/140
4,416,706 11/1983 Albrecht et al. ................. 148/402
4,484,955 11/1984 Hochstein ........................ 148/402

FOREIGN PATENT DOCUMENTS 86012 8/1983 European Pat. Off. .
57-63654 4/1982 Japan .

OTHER PUBLICATIONS

"Materials Science and Engineering" 51, (1981), pp. 181-192, Shape Memory Behavior and Thermoelastic Martensitic Transformations by Jeff Perkins.

Primary Examiner—Wayland Stallard
Attorney, Agent, or Firm—Wenderoth, Lind & Ponack

[57] ABSTRACT

A shaped part made of a composite material having shape memory properties is intended to be assembled in such a way that various changes in shape, including complex changes, take place in dependence on the temperature. This is achieved by providing that the shaped part has several sections which have shape memory properties and which are coupled together with one another in such a way that independent results of the shape memory effect cause temperature-specific changes in the shape of the shaped part, in the course of which the shaped part assumes the same number of permanent and/or reversible shapes as the number of sections having shape memory properties.

9 Claims, 3 Drawing Figures

SHAPED PART MADE OF A COMPOSITE MATERIAL AND A PROCESS FOR ITS PRODUCTION

BACKGROUND OF THE INVENTION

The present invention relates to a shaped part made of a composite material having shape memory properties. Advantageous process details for the production of this composite material are also described.

DISCUSSION OF THE PRIOR ART

Alloys that change their shape in dependence on the temperature as the result of structural transformation, after suitable treatment, have been disclosed in various publications (cf., for example, J. Perkins, "Shape Memory Behavior and Thermoelastic Martensitic Transformations", Materials Science and Engineering 1981, 51, 181–192). An essential precondition for the shape memory effect is a martensitic phase transformation, it being necessary for the phases involved to have as little difference in volume as possible, as well as ordered lattice structures. The irreversible shape memory effect (one-way effect) means that, after deforming in the martensitic state, the high-temperature shape is assumed on heating and is also subsequently retained on cooling. A reversible change of shape (two-way effect) can be induced by appropriate treatment whereby the high-temperature shape and the low-temperature shape of the shaped part are re-attained in each case when the part is alternately heated and cooled, respectively.

The temperatures at which the phase transformation sets in or is complete are usually designated as follows:

$A_s$: temperature at which the formation of the high-temperature phase begins, $A_f$: temperature at which the formation of the high-temperature phase is complete, $M_s$: temperature at which the formation of the low-temperature phase (martensite) begins, $M_f$: temperature at which the formation of the low-temperature phase (martensite) is complete.

The transformation temperatures $A_s$, $A_f$, $M_s$ and $M_f$ are appropriately linked, in functional elements, with a shape memory effect and with the beginning or the end of the change of shape.

Since the change of shape takes place with a relatively high energy, shape memory alloys have evoked considerable interest in industry and appear to be suitable for opening up a wide field of applications in all cases where temperature-dependent switching operations have to be carried out in a nearly abrupt manner.

In many applications, shape memory alloys can replace thermostatic bimetallic elements which have linear temperature deflection characteristics, so that in most cases laborious adjustments are required. Although abrupt changes in shape can be achieved on the basis of thermostatic bimetallic elements, for example by snapaction disks, these exhibit various disadvantages that cause additional costs when used in industry.

Elements that initiate switching processes at varying temperatures of response are required for certain switching processes in the technology of measurement and control.

SUMMARY OF THE INVENTION

Accordingly, it is an object of the present invention to provide new structural elements that make possible in a simple overall design switching processes for several successvie temperatures of response. This object is achieved in accordance with the invention by a procedure in which the shaped part contains several sections which have shape memory properties and are coupled together in such a way that results of the shape memory effect which are independent of one another cause temperature-specific changes in the shape of the shaped part, in the course of which the shaped part assumes the same number of permanent and/or reversible shapes as the number of sections having shape memory properties.

A shaped part of this type, composed of several sections having shape memory properties, can, for example, as a contact carrier, perform various successive switching processes at predetermined temperatures, or can provide an appropriate means, dependent on several temperatures, of actuating movement. In this respect, it is possible to combine several sections having not only different transformation temperatures, but also different magnitudes of effect and characteristics of effect (one-way and/or two-way effect). A very wide variety of complex switching characteristics can be produced thereby.

Since a shaped part of this type has in most cases to be mounted in a simple manner, it appears advantageous, as a further development of the invention, to design one section in the shape memory effect as a frictional mounting device for the shaped part. This makes it possible, for example, to insert the shaped part into a grooved recess and to fix it by a temperature-dependent change of shape.

It can also be advantageous to design the shaped part as a series arrangement of sections having shape memory properties and transformation temperatures varying in the same direction, i.e. the temperature differences between adjacent sections sequentially increase or decrease. A linear arrangement of this type produces, for example, at various temperatures various reversible or irreversible shapes that can be utilized for switching processes or the like.

The variation in the transformation temperatures between the individual sections can advantageously be produced by a linear or stepwise variation in the chemical composition of these sections. Moreover it is possible to combine sections of varying size and shape with one another.

It can also be advantageous to provide, on the shaped part, at least one section composed of a shape memory-free component or of a component which has shape memory properties and which has superelastic properties in the operational state. Under certain conditions, shape memory alloys have particularly high elastic deformation values. This phenomenon is known as pseudoelasticity or superelasticity. Superelastic behaviour can occur, for example, in certain temperature ranges of the high-temperature phase as the result of stress-induced formation of martensite.

An advantageous process for the production of a shaped part of this type can be carried out by coupling together metallurgically the shape memory components and, if appropriate, shape memory-free components to form a composite material in the form of a semifinished product, and by shaping the shaped part from this semifinished product, the shape memory properties required being produced by thermally treating the finished shaped part. In various cases the production and the coupling together of the components can be effected advantageously by powder metallurgy. A material having a series arrangement of differential sections of varying chemical composition can be produced advantageously by zone melting.

The coupling together of the sections of the shaped part is not limited to metallurgical bonds. On the contrary, it is also possible to produce other bonds, for example positive bonds or bonds resulting from joining the components with adhesives.

By the present invention it is possible to produce a shaped part made of composite material having shape memory properties which could be used in a wide range of applications especially for regulation and control mechanisms, for electrical contact carries and for mechanical controlling elements which may control the flow of media.

BRIEF DESCRIPTION OF THE DRAWINGS

Other objects, features and advantages of the present invention will be apparent from the following detailed description of a preferred embodiment thereof, with reference to the accompanying drawings, wherein.

DETAILED DESCRIPTION OF THE INVENTION

EXAMPLE I

Plates, 12 mm thick, of the following three Cu/Zn/Al shape memory alloys, produced by fusion metallurgy, were used as starting materials:

|  |  | Alloy A | Alloy B | Alloy C |
|---|---|---|---|---|
| Copper, | % by weight | 72.1 | 73.1 | 73.9 |
| Zinc, | % by weight | 22.1 | 20.7 | 19.5 |
| Aluminium, | % by weight | 5.8 | 6.2 | 6.0 |
| $A_s$-temperature, | °C. | −12 | +51 | +70 |

Figure 1:
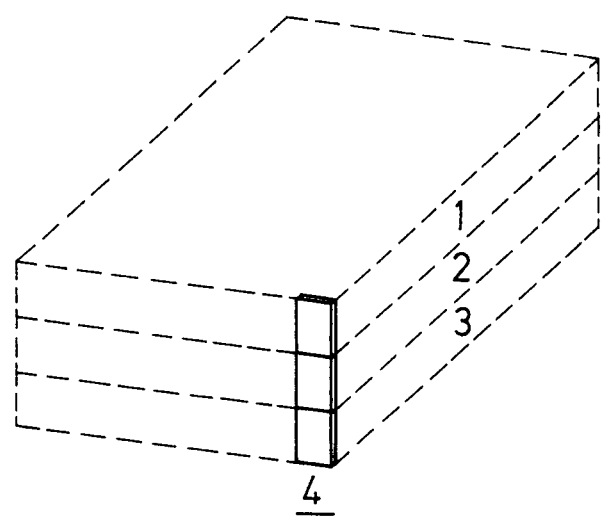
FIG. 1 shows a plate arrangement consisting of three components.
Figure 2:
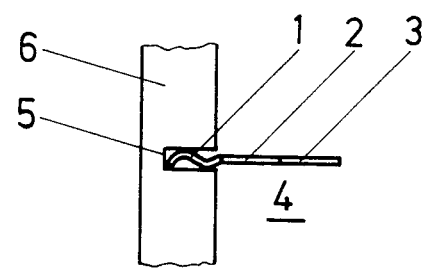
FIG. 2 shows a mounted shaped part consisting of a plate arrangement according to FIG. 1.

The plates 1, 2 and 3 (cf. FIG. 1) of the alloys A, B and C were laid flat on top of one another and were first thermally joined to one another by hot pressure welding at approx. 790° C., using two eutectic Cu/Ag foils 10μm thick. Specimens of dimensions 1×5×36 mm were then machined out, at right angles to the boundary surfaces, as shaped parts 4. After solution heat-treatment for 10 minutes in air at 830° C., these shaped parts were quenched in water and were provided, in the region of the components B and C, with a two-way bending effect of approx. 0.8% in each case, in the external layers. In the case of component A, after cooling below the temperature $M_f$, a one-way bending effect of 2% was induced in the external fibres at a temperature $T > A_s$. This effect serves to mount the shaped part 4 by bracing it in a slot 5 in a casing 6 of an apparatus (cf. FIG. 2). The two-way effects of the components B and C could be used to operate two micro-switches (not shown in the drawing) at different temperatures.

EXAMPLE II

The starting materials used are two powder mixtures, and the shape memory alloys prepared from these by powder metallurgy have the following composition:

|  |  | Alloy A | Alloy B |
|---|---|---|---|
| Copper, | % by weight | 73.7 | 72.1 |
| Zinc, | % by weight | 20.4 | 22.1 |
| Aluminium, | % by weight | 5.9 | 5.8 |
| $A_s$-temperature, | °C. | +30 | −12 |

Figure 3:
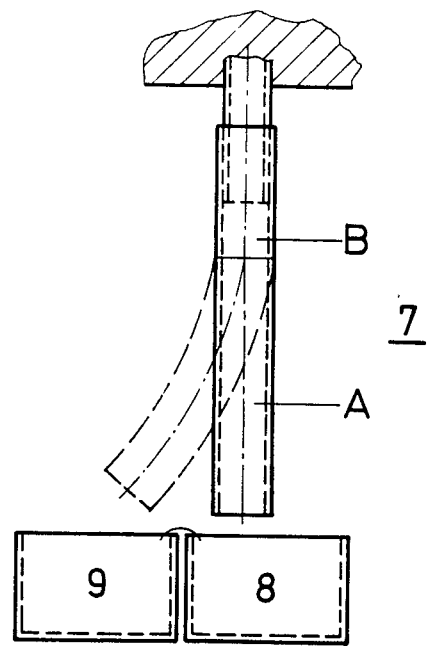
FIG. 3 shows a device for controlling the temperature of the inflow of water.

A cylindrical press of internal diameter 30 mm and height 250 mm, having a core of diameter 14 mm, was filled alternately to a height of 80 mm with powder of alloy A and to a height of 24 mm with a layer of powder of alloy B, and a preliminary pressure of 3000 bar was applied unindirectionally in each case in order to produce defined interfaces. The green compact was densified further by isostatic compression at a pressure of 5000 bar, using rubber tubes. The tube thus obtained was pre-sintered for 30 minutes at 910° C. under a protective gas, finally sintered for 6 hours at 950° C. and then subjected to an extrusion process using a mandrel, at 850° C. A tube having an external diameter of 13 mm and a wall thickness of 1.5 mm was finally obtained by cold drawing. Shaped parts 7 (see FIG. 3), each of which had a zone of alloy A 180 mm long and a zone of alloy B 50 mm long, were prepared from this tube. After solution heat-treatment at 830° C. in air for 10 minutes and quenching in water, a two-way bending effect of approx. 1% in the external fibres was induced in component A by training. The component B was first cooled below the temperature $M_f$, and a shape memory effect was then induced by enlarging the internal diameter by 3.5%. By means of the shape memory effect of the component B, a shaped part 7 of this type can be attached in a simple manner to a waterpipe, while the two-way effect of the component A can be utilized, for example, for the recovery of heat from an effluent. As an example of such an arrangement, water flows at temperatures below 35° C. into a vessel 8. If effluent at temperatures >35° C. makes its appearance, this hotter effluent is no longer collected in the vessel 8, but in a separate vessel 9, as a result of the pipe section turning because of the two-way effect. Appropriately shaped elements are suitable, in a special manner, for use in the fractional distillation of liquids.

Depending on the application, it can also be advantageous to induce a torsional two-way effect instead of the bending two-way effect in the devices mentioned, and to utilize this for the movement.

Although the present invention has been described and illustrated with respect to a specifically preferred embodiment thereof, it will be readily apparent to those skilled in the art that various structural modifications may be made without departing from the scope of the present invention. For example, rather than employing two or three alloys there could be used a multiple system of similar alloys. All such modifications are intended to be within the scope of the present invention.

We claim:

1. Shaped part made of a composite material having shape memory properties, said shaped part comprising a plurality of sections, at least several of which have different shape memory properties capable of achieving two-way and/or one-way effects, said sections being coupled metallurgically together in such a way that results of said shape memory effects which are independent of one another cause temperature-specific changes in the shape of said shaped part, in the course of which said shaped part assumes the same number of permanent and/or reversible shapes as the number of said sections having shape memory properties.

2. A shaped part as claimed in claim 1, wherein one said section having a shape memory effect is constructed as a frictional holding device for said shaped part.

3. A shaped part as claimed in claim 1, whereby said shaped part comprises a series arrangement of said sections having different shape memory properties and different transformation temperatures between said sections, said transformation temperatures between adjacent said sections sequentially increasing or decreasing.

4. A shaped part as claimed in claim 3, wherein said sequential increasing or decreasing of said transformation temperatures between adjacent said sections is produced by a linear or stepwise change in the chemical composition of said sections.

5. A shaped part as claimed in claim 1, wherein at least one said section of said shaped part is made of a component which is free from shape memory.

6. A shaped part as claimed in claim 1, wherein at least one said section of said shaped part has shape memory properties and superelastic properties in the operational state.

7. A process for the production of a shaped part made of a composite material having shape memory properties, said process comprising metallurgically coupling together a plurality of components, at least several of which have different shape memory properties, thereby forming a semi-finished product, shaping said semi-finished product to form a shaped part including a plurality of sections of the materials of said coupled components, and thermally treating said shaped part at temperatures sufficient to induce in several said sections two-way and/or one-way shape memory effects required.

8. A process as claimed in claim 7, wherein said treating comprises zone melting a series arrangement of differential said sections of different chemical composition.

9. A process as claimed in claim 7, wherein said coupling together of said components is effected by powder metallurgy.

* * * * *